United States Patent [19]

Bernard

[11] 4,359,093

[45] Nov. 16, 1982

[54] METHOD FOR ENHANCED OIL RECOVERY IN RESERVOIRS CONTAINING DISSOLVED DIVALENT METAL CATIONS

[75] Inventor: George G. Bernard, La Mirada, Calif.

[73] Assignee: Union Oil Co. of California, Brea, Calif.

[21] Appl. No.: 208,863

[22] Filed: Nov. 21, 1980

[51] Int. Cl.³ .............................................. F21B 43/24
[52] U.S. Cl. .................................... 166/273; 166/274
[58] Field of Search ................ 252/8.55 D; 166/273, 166/274, 275

[56] References Cited

U.S. PATENT DOCUMENTS

| Re. 29,219 | 5/1977 | Flournoy et al. | 166/273 X |
|---|---|---|---|
| 1,651,311 | 11/1927 | Atkinson . | |
| 3,292,697 | 12/1966 | Abdo | 252/8.55 D X |
| 3,371,710 | 3/1968 | Harvey et al. | 166/274 X |
| 3,410,343 | 11/1968 | Abdo | 166/274 |
| 3,414,053 | 12/1968 | Treiber et al. | 166/9 |
| 3,522,844 | 8/1970 | Abdo | 166/273 X |
| 3,621,913 | 11/1971 | Braden, Jr. | 166/274 X |
| 3,684,720 | 8/1972 | Richardson | 252/86 |
| 3,853,771 | 12/1974 | Felmann | 252/8.55 D X |
| 3,871,452 | 3/1975 | Sarem | 166/270 |
| 3,874,454 | 4/1975 | Clark et al. | 166/274 X |
| 3,920,074 | 11/1975 | Sarem | 166/274 |
| 4,036,300 | 7/1977 | Holm et al. | 166/273 |

*Primary Examiner*—Stephen J. Novosad
*Assistant Examiner*—George A. Suchfield
*Attorney, Agent, or Firm*—Dean Sandford; Gregory F. Wirzbicki; Gerald L. Floyd

[57] ABSTRACT

A method for the enhanced recovery of oil from subterranean reservoirs having connate water containing dissolved divalent metal cations wherein there is injected via an injection well a slug of an aqueous solution containing a water-soluble alkaline material and an aminopolycarboxylic acid or a salt thereof as a chelating agent followed by an aqueous drive fluid while producing fluids from the reservoir via a production well.

10 Claims, No Drawings

METHOD FOR ENHANCED OIL RECOVERY IN RESERVOIRS CONTAINING DISSOLVED DIVALENT METAL CATIONS

BACKGROUND OF THE INVENTION

1. Field of the Invention

This invention relates to an improved enhanced oil recovery process. More particularly, the invention relates to such a process for use in subterranean reservoirs containing both a crude oil containing potentially surface active organic acids and an aqueous phase containing water-soluble dissolved divalent metal cations.

2. Description of the Prior Art

There are numerous methods for the enhanced recovery of oil from subterranean reservoirs. Many of these methods involve injection via an injection well of a slug of an aqueous treating solution followed by a slug of drive fluid while producing fluids from the reservoir via a production well. One particular method long recognized by those skilled in the art, involves, in part, injection of a slug of a highly alkaline aqueous solution. U.S. Pat. No. 1,651,311 to Atkinson describes a method for recovering additional oil from a reservoir following primary production by forcing through the reservoir an aqueous solution of a strong alkali, such as soda ash, caustic soda or caustic potash. Although the mechanism by which such an alkaline solution functions as an enhanced recovery fluid is not completely understood, it is believed that in one aspect the treating solution reduces the oil-water interfacial tension in the reservoir by activation by the alkaline material of potentially surface active organic acids naturally occurring in the reservoir crude oil. Also, in some reservoirs, the treating solution may produce a wettability reversal that improves the displacement of oil, i.e., the wettability of the reservoir is reversed from oil-wet to water-wet. Thus, an aqueous drive fluid is more effective in displacing oil from the reservoir.

Various other enhanced oil recovery systems have been suggested. Many reservoirs contain an aqueous phase or brine in addition to oil. It is not uncommon for brine to contain dissolved divalent metal cations such as calcium, magnesium and iron in addition to various other anions and cations. It has been recognized with enhanced oil recovery systems other than those depending primarily on aqueous solutions of alkaline materials, e.g., micellar displacement systems made up of a micellar solution phase and an aqueous phase, that the presence of such dissolved metal cations in the reservoir brine decreases the effectiveness of the enhanced oil recovery system. U.S. Pat. No. 4,036,300 to Holm et al. shows a petroleum recovery process employing an improved micellar improvement system which is effective even in the presence of divalent cations. The micellar displacement system includes a micellar solution phase and an aqueous phase incorporating an aminopolycarboxylic acid chelating agent or the ammonium or alkali metal salt thereof. In one embodiment the micellar displacement system can be prepared, in part, by adding the acid form of the chelating agent to the aqueous phase and then adjusting the pH of this phase to at least about 9 by the addition thereto of a basic material such as ammonium, sodium or potassium hydroxide.

In various treatments of well bores and the surrounding environment other than enhanced oil recovery treatments, it is common to contact the reservoir with an aqueous solution of various materials. In U.S. Pat. No. 3,684,720 to Richardson there is described a method for removing calcium sulfate scale from surfaces such as the bore hole wall, pipe and the formation itself by contacting the same with an inert solvent which is preferably deionized water containing (1) a scale converter selected from ammonium and alkali metal carbonates, bicarbonates, hydroxides, phosphates, oxylates and normally liquid lower alkyl amines and hydroxy substituted derivatives thereof, and (2) a chelating agent such as the ammonium, amine, hydroxylamine and alkali metal salts of alkylenepolyamine polycarboxylic acids, nitrilotriacetic acid and N-2-hydroxyethylamino diacetic acid. The solvent and complexed scale are then removed from the well.

While many of the above described processes have certain advantages, need remains for an enhanced oil recovery method which is more effective in displacing oil for use in reservoirs containing both a residual oil phase which is especially susceptible to displacement by an aqueous alkaline solution and an aqueous phase, i.e., connate water, containing dissolved divalent metal cations which are harmful to many enhanced oil recovery systems, which cations may react with and remove from the enhanced oil recovery composition certain treating agents.

Accordingly, it is a principal object of this invention to provide a method for the enhanced recovery of oil from reservoirs containing a crude oil phase which is especially susceptible to displacement by an aqueous alkaline solution.

It is another object of the invention to provide such a method wherein the crude oil contains potentially surface active organic acids.

It is a further object of the invention to provide such a method wherein the reservoir also contains connate water containing dissolved divalent metal cations.

It is a still further object of the invention to provide such a method for recovery of viscous crude oil.

It is yet another object of the invention to provide such a method employing an aqueous alkaline solution wherein precipitation of divalent metal salts of the alkaline material in the reservoir is minimized.

Other objects, advantages and features of the invention will become apparent from the following description and appended claims.

SUMMARY OF THE INVENTION

A method for the enhanced recovery of oil from subterranean reservoirs which contain both crude oil containing natural occurring potentially surface active organic acids and connate water containing dissolved divalent metal cations wherein there is injected via an injection well an effective amount of an aqueous solution containing about 0.1 to 5 weight percent water-soluble alkaline material and about 0.01 to 0.6 weight percent of an aminopolycarboxylic acid or water-soluble salt thereof. Thereafter, a drive fluid is injected via the same or a different injection well to drive the previously injected aqueous solution through the reservoir, and fluids are produced from the reservoir via a spaced production well.

DETAILED DESCRIPTION OF THE INVENTION

In an enhanced oil recovery process a displacement fluid is injected via an injection well into a reservoir containing hydrocarbons, i.e., crude petroleum, in an attempt to displace the hydrocarbons through the reservoir toward a recovery well through which they are recovered. Due to cost and other considerations it is often preferred to use an aqueous fluid as the displacement fluid. However, hydrocarbons are seldom completely displaced by an aqueous fluid due, at least in part, to the relatively high interfacial tension between the petroleum and the aqueous fluid and to the tendency of the hydrocarbons to adhere strongly to oil-well reservoir rock.

Crude petroleum is known to contain varying amounts of saponifiable materials such as petroleum acids which react with alkaline materials to form soaps that reduce the interfacial tension between the crude petroleum and water. Thus, if the displacement fluid is an aqueous solution of an alkaline material, the amount of crude oil displaced thereby is increased. These potentially surface active organic acids or petroleum acids found in any particular crude petroleum can include various carboxylic acids and phenolic acids. Saponification of these acids forms surface active agents that reduce the interfacial tension between the crude petroleum and water. The amount of these saponifiable materials in a crude petroleum and their effect upon the surface active properties of the system can be characterized by the variation of the interfacial tension of the oil-water system as a function of pH. The interfacial tension of a typical crude petroleum-water system at a low pH of about 2 to 9 is usually about 20 to 40 dynes/cm. Those crude oils having significantly high contents of saponifiable materials are characterized by reduced interfacial tension at high pH. The method of this invention is particularly applicable to the recovery of crude petroleum that exhibits an interfacial tension with water at a high pH of about 10 to 13 of 5 dynes/cm or less, and more particularly to crude petroleum that exhibits an interfacial tension of 2 dynes/cm or less, and preferably less than 1 dyne/cm.

When the connate water or clays of a reservoir contain multivalent metal cations, particularly calcium, magnesium and iron, such cations tend to react with alkali anions present in the displacement fluid to form insoluble precipitates. Alkaline hydroxides can form calcium, magnesium and iron hydroxides. Alkaline silicates can form silica as well as calcium, magnesium and iron silicates and hydroxides. This precipitation decreases the number of alkaline anions available for saponification of acids in the crude petroleum, causes undesirable plugging of reservoir porosity and lowers the effectiveness of the displacement fluid system.

Addition of an aminopolycarboxylic acid chelating agent to the displacement fluid system overcomes many of the problems encountered in the use of aqueous alkaline displacement fluids in reservoirs containing dissolved divalent metal cations and crude oil containing potentially surface active organic acids. Any of the aminopolycarboxylic acid agents can be used in the present invention such as, for example; ethylenediaminetetracetic acid (EDTA), diethylenetriaminepentaacetic acid (DTPA), cyclohexane trans-1, 2-diaminetetraacetric acid (CDTA), ethanoldiglycine (EDG), diethanolglycine (DEG), hydroxyethyl-ethylene-diaminetriacetic acid (HEDTA), ethylene bis [2-(o-hydroxyphenyl)-glycine], and nitrilotriacetic acid (NTA). Typically these materials are supplied commercially as the sodium salt although the potassium or ammonium salts are also available and are used with good results. In any event the free acid is readily converted to the salt form by admixture of a water solution of the acid with the alkaline material. In addition, all or only a portion of the carboxy sites in the molecule need be substituted with an ammonium or alkali metal cation. Taking for example the sodium salt of EDTA, the di- and trisodium salts are useful although the tetrasodium salt is preferred. These chelating agents are available commercially and the various methods for their preparation, including the water-soluble ammonium and alkali metal salts thereof, are well known in the art. An aqueous solution containing about 0.01 to 0.6 weight percent chelating agent is generally employed. Preferably, the aqueous solution contains about 0.05 to 0.5 weight percent chelating agent.

In preparing the treating solution of this invention using water that contains divalent cations, the chelating agent should be added to the water before addition thereto of the alkaline material.

The water-soluble alkaline material employed in the practice of this invention can be an alkali metal or ammonium hydroxide such as sodium hydroxide, potassium hydroxide or ammonium hydroxide, or an alkali metal silicate having a molar ratio of $M_2O/SiO_2$ of 1 and above, particularly from about 1.5 to about 2.5, wherein M is an alkali metal atom, such as sodium, potassium, lithium, cesium and rubidium, exemplary of which are alkali metal orthosilicate, alkali metal metasilicate, alkali metal metasilicate pentahydrate and alkali metal sesquisilicate. Particular agents useful in the practice of the invention include sodium and potassium orthosilicate, sodium and potassium metasilicate, sodium and potassium metasilicate pentahydrate, and sodium and potassium sesquisilicate. The pH of aqueous solutions containing the concentrations of alkaline sodium silicates from about 0.02 to 5 weight percent ranges from about 10.8 to 13. An aqueous solution containing about 0.1 to 5 weight percent alkaline material can be employed. Preferably about 0.3 to 1.5 weight percent is used. Using the process of this invention as part of an enhanced oil recovery method, a slug of about 0.1 to 0.5 pore volume of an aqueous solution of a water-soluble alkaline material is employed. Preferably a slug of about 0.2 to 0.4 pore volume is used. Some of the alkaline materials used in the practice of this invention are available in solid form. Others are available in either solid form or as a concentrated aqueous solution. The solutions to be used can be prepared by dissolving an appropriate quantity of the alkaline material in water or by admixing with additional water. In many cases with alkaline alkali metal silicates it is preferred to prepare the desired solution by adding caustic to an aqueous solution of a low-alkalinity alkali metal silicate having a $M_2O/SiO_2$ ratio of less than 1.

Optionally the injection of the aqueous solution of an alkaline material and a chelating agent can be preceeded by a preflush of about 0.1 to 0.5 reservoir pore volumes of water which does not contain a substantial amount of free divalent cations. Since most waters available in the field contain some divalent cations, there is added to the preflush water an effective amount of a chelating agent of the same type and in the same concentration range as is used in the aqueous solution of an alkaline material. This preflush displaces from the area immediately surrounding the injection well the reservoir water which contains divalent cations. The preflush further decreases the possibility of precipitation of divalent ion-containing salts in the reservoir when reservoir water comes in contact with an aqueous solution containing an alkaline material.

It is also optional to employ similar volumes of the same treated water as an afterflush following the injection of the treating solution and preceeding the injection of a drive fluid.

Where the aqueous solution of an alkaline material is followed by drive fluid, conventional flooding agents may be used in a conventional manner. Accordingly, the flooding medium can be water, brine, or a dilute aqueous solution of a water-soluble polymer exhibiting a viscosity greater than that of the water or brine; the flooding medium being injected through one or more injection wells to displace oil towards one or more spaced production wells. A number of water-soluble polymers are known to decrease the mobility of water in porous media when dissolved therein in relatively dilute concentrations. Water-soluble polymeric materials that can be employed are relatively high molecular weight acrylic acid-acrylamide copolymers, acrylic acid-acrylamide-diacetone acrylamide terpolymers, partially hydrolyzed polyacrylamides, hydroxyethyl cellulose, carboxymethyl cellulose, polyacrylamides, polyoxyethylenes, modified starches, heteropolysaccharide obtained by the fermentation of starch derived sugar, polyvinyl alcohol, polyvinyl pyrollidone, and polystyrene sulfonates.

The invention is further illustrated by the following examples which are illustrative of various aspects of the invention and are not intended as limiting the scope of the invention as defined by the appended claims.

EXAMPLE 1

A laboratory test is made to determine the amount of oil recovered by flooding an oil-containing core with an aqueous solution of sodium orthosilicate according to prior art methods. A rectangular Berea sandstone core having a width of 1.5 inches, a height of 1.5 inches and a length of 9.5 inches is coated with a plastic material which, when set, forms an adherent fluid-impervious film around the core. A 0.25 inch diameter hole is centrally drilled to a depth of 0.5 inch in the opposite end faces of the core having the small surface area. The holes are then tapped with tubing. The core has a permeability of about 400 millidarcys and a porosity of about 22 volume percent. The core is saturated with water produced from a California well containing the following:

| Constituent | Concentration (milligrams/liter) |
|---|---|
| Calcium ion | 54 |
| Magnesium ion | 30 |
| Sodium ion | 5,800 |
| Chlorine ion | 7,850 |
| Sulfate ion | 66 |
| Bicarbonate ion | 1,230 |
| Total Dissolved Solids | 15,499 |
| pH | 8.0 |

During this step and throughout the remainder of the test, the core is wrapped with electrically heated tape connected to a thermostatic device and held at a temperature of 160° F. All fluids injected through the core during the test are injected at a flow rate of 5 feet per day. Next the core is flooded to about 65 percent oil saturation with oil from the same California well, which oil has an acid number of 0.090, a viscosity at 160° F. of 6.6 centipoises and a viscosity at 100° F. of 17.0 centipoises. Then the core is sequentially flooded with 3 pore volumes of produced water, followed by 0.5 pore volume of an aqueous solution containing 0.4 weight percent Metso 200 alkaline material*, followed by 2.3 pore volumes of the same produced water. During the injection of these fluids the cumulative percent of oil recovered is periodically determined. The results of this test are shown in the Table below. The first column gives the cumulative pore volume of all fluids injected, i.e., the total volumes of water, alkaline solution and additional water. The second column gives the pore volume of fluid injected in each of the three stages. A total of 54.4 percent oil is recovered by the waterflood, i.e., prior to the injection of the alkaline material-containing solution. A total of 58.8 percent oil is recovered during the entire test.

*Metso 200 marketed by Philadelphia Quartz Company is a concentrated sodium orthosilicate analyzing 60.99 percent by weight sodium oxide, 29.0 percent silicon dioxide and 9.0 percent water.

The percent tertiary oil recovered is calculated from the following equation:

$$\text{percent tertiary oil} = \frac{\text{Percent oil recovered during test} - \text{Percent oil recovered prior to injection of alkaline material - containing solution}}{100 - \text{Percent oil recovered prior to injection of alkaline material - containing solution}}$$

$$= \frac{58.8 - 54.4}{100 - 54.4}$$

$$= 9.6$$

EXAMPLE 2

Another laboratory test is made following the same procedure as in Example 1 except that the aqueous alkaline solution contains 0.4 weight percent Metso 200 alkaline material and 0.05 weight percent nitrilotriacetic acid chelating agent as taught by this invention. The results of this test are shown in the Table below. In this example 51.4 percent of the oil is recovered by the waterflood and 67.2 percent is recovered during the entire test.

$$\text{percent tertiary oil recovered} = \frac{67.2 - 51.4}{100 - 51.4}$$

$$= 32.5$$

A comparison of the results of Example 1, exemplary of a prior art enhanced oil recovery method, and Example 2, exemplary of the enhanced oil recovery method of this invention, shows that during injection of produced water, before injection of the aqueous solution containing an alkaline material, there was slightly more oil produced from the core in Example 1 than from the core in Example 2. The injection of the alkaline-containing solution and following produced water in Example 1 resulted in only a slight further increase in oil recovery. This volume of oil is referred to as tertiary oil. The injection of the solution containing both an alkine material and a chelating agent followed by produced water in Example 2 resulted in a sharp increase in oil recovery, i.e., tertiary oil.

TABLE

OIL RECOVERY FROM A BEREA SANDSTONE CORE DURING ENHANCED OIL RECOVERY PROCESS

| Cumulative Pore Volume of Fluid Injected | Pore Volume of Each Fluid Injected | | Oil Recovery (percent) | |
|---|---|---|---|---|
| | | | Example 1* | Example 2* |
| 0.2 | 0.2 | Produced Water | 28 | 26 |
| 0.4 | 0.4 | " | 41 | 38 |
| 0.6 | 0.6 | " | 44 | 41 |
| 0.8 | 0.8 | " | 47 | 45 |
| 1.0 | 1.0 | " | 48 | 46 |
| 1.2 | 1.2 | " | 49 | 46.5 |
| 1.4 | 1.4 | " | 50 | 47 |
| 1.6 | 1.6 | " | 51 | 47.5 |
| 1.8 | 1.8 | " | 51 | 48 |
| 2.0 | 2.0 | " | 51.5 | 48 |
| 2.2 | 2.2 | " | 51.5 | 49 |
| 2.4 | 2.4 | " | 52 | 50 |
| 2.6 | 2.6 | " | 53 | 50.5 |
| 2.8 | 2.8 | " | 53 | 51.0 |
| 3.0 | 3.0 | " | 54.4 | 51.4 |
| 3.5 | 0.5 | Solution of Alkaline Material* | 55 | 55 |
| 3.8 | 0.3 | Produced Water | 55.5 | 59 |
| 4.2 | 0.7 | " | 55.8 | 60 |
| 4.6 | 1.1 | " | 56.6 | 62 |
| 5.4 | 1.9 | " | 57.5 | 64 |
| 5.8 | 2.3 | " | 58.8 | 67.2 |

*For Example 1 the Solution of Alkaline Material is an aqueous solution containing 0.4 weight percent Metso 200 sodium orthosilicate. For Example 2 the Solution of Alkaline Material is an aqueous solution containing 0.4 weight percent Metso 200 sodium orthosilicate and 0.05 weight percent nitrilotriacetic acid chelating agent.

EXAMPLE 3

It is desired to treat a reservoir having a pore volume of 37,000,000 barrels which is penetrated by a plurality of injection wells and production wells in an attempt to recover tertiary oil after the reservoir has been subjected to a waterflood. The water available contains 50 parts per million calcium ion and 25 parts per million magnesium ion. If an alkaline material were added directly to this water, undesirable precipitates would form. The injection wells are first treated with a 0.1 pore volume preflush by injecting 3,700,000 barrels of the available water containing 1,154,000 pounds of the tetrasodium salt of ethylenediaminetetracetic acid (EDTA). Next there is injected into the reservoir 0.25 pore volumes treating solution comprising 9,250,000 barrels of the available water containing 32,000,000 pounds sodium hydroxide and 2,886,000 pounds EDTA. The injection is carried out by pumping a stream of untreated area water towards each injection well via a conduit, metering into the flowing stream the EDTA, allowing the components to mix as they flow through the conduit, then metering into the flowing mixture sodium hydroxide in the form of a 50 percent by weight aqueous solution of sodium hydroxide, and injecting the composition into the reservoir via the injection wells. The treating solution is followed by injection into the reservoir of 3,700,000 barrels of the available water containing 1,154,000 pounds EDTA as an 0.1 pore volume afterflush. Finally, there is injected 74,000,000 barrels of untreated area water as a drive fluid. During the above-described injection sequence, tertiary oil is produced via the production wells.

Various embodiments and modifications of this invention have been described in the foregoing specification, and further modifications will be apparent to those skilled in the art. Such modifications are included within the scope of this invention as defined by the following claims.

Having now described my invention, I claim:

1. A method for recovering petroleum from a subterranean reservoir penetrated by an injection well and at least one spaced production well comprising:
    (a) injecting into said reservoir through said injection well a 0.1 to 0.5 pore volume slug consisting essentially of an aqueous solution containing about 0.1 to 5 percent by weight of a water-soluble alkaline material selected from the group consisting of ammonium and alkali metal hydroxides, and alkaline alkali metal silicates having a molar ratio of $M_2O/SiO_2$ of 1 or above wherein M is an alkali metal atom, about 0.01 to 0.6 percent by weight of a chelating agent comprising an aminopolycarboxylic acid or a water-soluble salt thereof, and the remainder water,
    (b) thereafter injecting an aqueous flooding medium into said injection well to drive the aqueous solution of (a) toward said spaced production well, and
    (c) recovering fluids from the reservoir via said production well.

2. The method of claim 1 wherein the aqueous solution of (a) is prepared by adding the aminopolycarboxylic acid or a water-soluble salt thereof to the water before the addition thereto of the water-soluble alkaline material.

3. The method of claim 1 wherein the injection of the aqueous solution of (a) is followed by injection of an 0.1 to 0.5 pore volume slug of an afterflush comprising an aqueous solution of water containing divalent cations and an effective amount of an aminopolycarboxylic acid or a water-soluble salt thereof.

4. The method of claim 1 wherein the chelating agent is selected from the group consisting of ethylene diaminetetraacetic acid, diethylenetriaminepentaacetic acid, cyclohexane trans-1,2-diaminetetraacetic acid, ethanoldiglycine, diethanolglycine, hydroxyethyl-ethylene-diamine-triacetic acid, ethylene bis [2-(o-hydroxyphenyl)-glycine], nitrilotriacetric acid, the ammonium salts thereof, the alkali metal salts thereof and mixtures thereof.

5. The method of claim 1 wherein said chelating agent is the trisodium salt of nitrilotriacetic acid.

6. The method of claim 1 wherein the water-soluble alkaline material is sodium hydroxide.

7. The method of claim 1 wherein the water-soluble alkaline material is sodium or potassium orthosilicate, sodium or potassium metasilicate, sodium or potassium metasilicate pentahydrate, or sodium or potassium sesquisilicate.

8. The method of claim 7 wherein the water-soluble alkaline material is sodium orthosilicate.

9. A method for recovering tertiary oil from a subterranean reservoir penetrated by an injection well and at least one spaced production well, which reservoir has been subjected to a waterflood, comprising producing the production well while sequentially injecting into said reservoir through said injection well:
    (a) a 0.1 to 0.5 pore volume slug of a preflush comprising an aqueous solution of water containing divalent cations and an effective amount of nitrilotriacetic acid chelating agent or a sodium salt thereof,
    (b) a 0.2 to 0.4 pore volume slug of an aqueous solution containing about 0.05 to 0.5 percent by weight nitrilotriacetic acid chelating agent or a sodium salt thereof and about 0.3 to 1.5 percent by weight sodium orthosilicate or sodium hydroxide, said aqueous solution being prepared by adding said chelating agent to the aqueous solution before addition thereto of the sodium orthosilicate or sodium hydroxide, (c) a 0.1 to 0.5 pore volume slug of an afterflush comprising an aqueous solution of water containing divalent cations and an effective amount of nitrilotriacetic acid chelating agent or a sodium salt thereof, and (d) an aqueous drive fluid.

10. A method for recovering petroleum from a subterranean reservoir penetrated by an injection well and at least one spaced production well comprising:

(a) injecting into said reservoir through said injection well a 0.1 to 0.5 pore volume slug of preflush comprising an aqueous solution of water containing divalent cations and an effective amount of an aminopolycarboxylic acid or a water-soluble salt thereof, (b) injecting a 0.1 to 0.5 pore volume slug of an aqueous solution containing about 0.1 to 5 percent by weight of a water-soluble alkaline material selected from the group consisting of ammonium and alkali metal hydroxides, and alkaline alkali metal silicates having a molar ratio of $M_2O/SiO_2$ of 1 or above wherein M is an alkali metal atom, and about 0.01 to 0.6 percent by weight of a chelating agent comprising an aminopolycarboxylic acid or a water-soluble salt thereof, (c) thereafter injecting an aqueous flooding medium into said injection well to drive the aqueous solution of (b) toward said spaced production well, and (d) recovering fluids from the reservoir via said production well.

* * * * *